United States Patent
Kim

(10) Patent No.: US 8,159,476 B2
(45) Date of Patent: Apr. 17, 2012

(54) MOBILE TERMINAL COMPRISING ROTARY TYPE INPUT DEVICE AND METHOD OF SETTING SENSITIVITY USING THE SAME

(75) Inventor: Jin Hee Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1043 days.

(21) Appl. No.: 12/002,172

(22) Filed: Jul. 12, 2007

(65) Prior Publication Data

US 2008/0165124 A1   Jul. 10, 2008

(30) Foreign Application Priority Data

Jul. 14, 2006 (KR) .................. 10-2006-0066082

(51) Int. Cl.
*G06F 3/033* (2006.01)

(52) U.S. Cl. ........................ 345/184; 345/156

(58) Field of Classification Search ........... 345/156–184
See application file for complete search history.

(56) References Cited

U.S. PATENT DOCUMENTS

| 6,097,371 A * | 8/2000 | Siddiqui et al. ............ 345/164 |
| 7,720,552 B1 * | 5/2010 | Lloyd ........................... 700/10 |
| 2005/0231466 A1 * | 10/2005 | Tada .............................. 345/156 |

FOREIGN PATENT DOCUMENTS

| JP | 7-270454 A | 10/1995 |
| JP | 10-92057 A | 4/1998 |
| JP | 2004-273268 A | 9/2004 |

* cited by examiner

*Primary Examiner* — Kevin M Nguyen
*Assistant Examiner* — Cory Almeida
(74) *Attorney, Agent, or Firm* — Birch, Stewart, Kolasch & Birch, LLP

(57) ABSTRACT

This document relates to a mobile terminal comprising a rotary type input device and a method of setting a sensitivity using the same. The mobile terminal comprises a display unit for displaying a selection indicator, an input unit comprising a rotary type input device, which is rotated and moved in one or more directions, and configured to set sensitivity information indicating a sensitivity when the rotary type input device is rotated and moved, and a controller for sensing the rotary movement of the rotary type input device and controlling movement of the selection indicator, based on the sensitivity information set by the input unit. Accordingly, there is an advantage in that a user can set a rotation sensitivity of the rotary type input device.

19 Claims, 14 Drawing Sheets

MOBILE TERMINAL COMPRISING ROTARY TYPE INPUT DEVICE AND METHOD OF SETTING SENSITIVITY USING THE SAME

This Nonprovisional application claims priority under 35 U.S.C. §119(a) on Patent Application No. 10-2006-0066082 filed in Korea on Jul. 14, 2006, the entire contents of which are hereby incorporated by reference.

BACKGROUND

1. Field

This document relates to a mobile terminal comprising a rotary type input device and a method of setting sensitivity using the same.

2. Related Art

As the demand for mobile terminals increases rapidly, a lot of supplementary functions, such as text or multimedia messages, a telephone directory, a photograph album, MP3, motion images, and schedules, have been developed and serviced.

A mobile terminal is equipped with several input devices for facilitating the search and selection of the supplementary functions. Of the several input devices, a jog disk generally has a disk shape. A user can easily search and select menus and data, such as photographs stored in the mobile terminal, as well as music by rotating and moving the jog disk using a fingertip.

Although the sensitivity is the same when the jog disk is used, a user may feel different. However, there is a problem that a user could not set the sensitivity to his taste.

There is also another problem in which operation delay occurs due to a time lag in an actual process in the mobile terminal when the jog disk is rapidly rotated and moved physically.

SUMMARY

An aspect of this document is to allow a user to set the rotation sensitivity of a rotary type input device.

Another aspect of this document is to variably set a recognition cycle where a rotation signal is recognized as a basic input signal based on a speed at which a user gives an input to a rotary type input device.

Still another aspect of this document is to prevent the occurrence of unwanted output signals, which is incurred by a processing delay of rotation signals despite that the rotary movement of a rotary type input device has been finished.

BRIEF DESCRIPTION OF THE DRAWINGS

The implementation of this document will be described in detail with reference to the following drawings in which like numerals refer to like elements.

DETAILED DESCRIPTION

Hereinafter, a mobile terminal comprising a rotary type input device and a method of setting the sensitivity using the same in accordance with an embodiment of this document will be described in detail with reference to the attached drawings.

<Embodiment—Set Rotation Sensitivity of Jog Disk>

Figure 1:
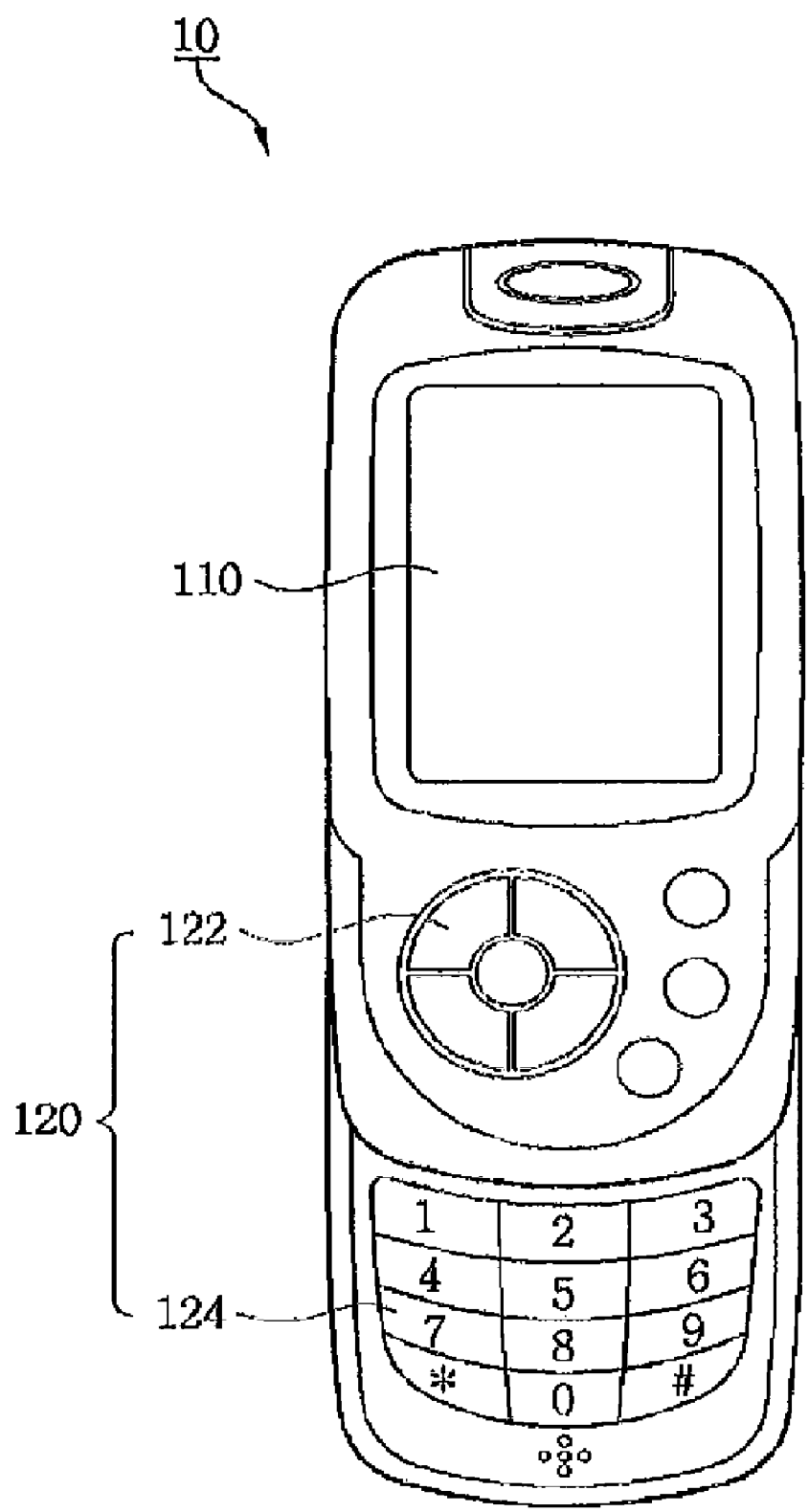
FIG. 1 illustrates a mobile terminal comprising a rotary type input device in accordance with an embodiment of this document.

FIG. 1 illustrates a mobile terminal comprising a rotary type input device in accordance with an embodiment of this document.

Referring to FIG. 1, a mobile terminal 10 according to an embodiment of this document comprises a display unit 110 and an input unit 120. The input unit 120 can comprise a jog disk 122 and a keypad 124. The jog disk 122 comprises a rotary type input device, which is rotated and moved in one or more directions, and is used to set the sensitivity at the time of rotary movement.

An exemplary construction of the mobile terminal 10 comprising the jog disk 122 is as follows.

Figure 2:
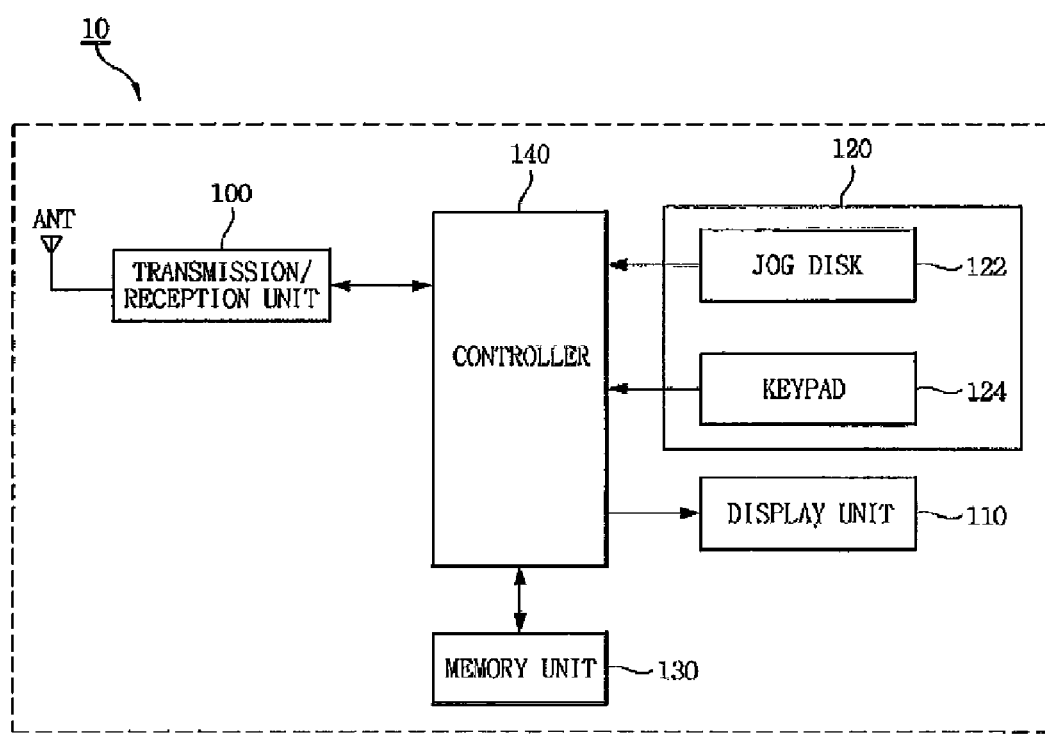
FIG. 2 is a block diagram showing the construction of the mobile terminal comprising the rotary type input device in accordance with an embodiment of this document.

FIG. 2 is a block diagram showing the construction of the mobile terminal comprising the rotary type input device in accordance with an embodiment of this document.

Referring to FIG. 2, the mobile terminal 10 comprises a transmission/reception unit 100, a display unit 110, an input unit 120, a memory unit 130, and a controller 140.

The transmission/reception unit 100 communicates with a base station through an antenna ANT, and transmits and receives data, such as music, photographs, notion images, and messages.

The display unit 110 displays various pieces of information signals thereon, such as music, photographs, motion images, messages, and menus, which are received from the transmission/reception unit 100. The display unit 110 displays thereon a selection indicator for selecting any one of the menus, such as a selection bar or a cursor.

The input unit 120 can comprise a jog disk 122 and a keypad 124. The jog disk 122 comprises a rotary type input device that is rotated and moved in one or more directions, and generates a rotation signal at specific angles. The rotation signal is recognized according to a recognition cycle where the rotation signal is recognized as a basic input signal in the controller 140, and serves to move the selection indicator. The keypad 124 is equipped with numeric keys and various function keys, and can comprise a keypad, a touch pad and so on. Sensitivity information, indicating the sensitivity when the jog disk 122 is rotated and moved, can be set through the input unit 120.

The memory unit 130 can comprise flash memory, RAM, electrically erasable programmable read only memory (EEPROM) or the like, and stores therein a program for controlling an overall operation of the mobile terminal 10. The memory unit 130 stores therein sensitivity information of the jog disk 122, which is set by the input unit 120.

The controller 140 is equipped with a mobile station modem (MSM), and controls general inputs and outputs of the mobile terminal 10. The controller 140 senses rotary movement of the rotary type input device 122 based on sensitivity information set by the input unit 120, and controls the movement of the selection indicator.

The controller 140 controls the recognition cycle where the rotation signal, generated from the rotary type input device 122, is recognized as the basic input signal to be faster than a specific reference when sensitivity information is set to be more sensitive than a reference. Thus, the selection indicator displayed on the display unit 110 is moved at a speed faster than a specific speed.

The controller 140 recognizes the recognition cycle to be slower than a specific reference when sensitivity information is set to be less sensitive than a reference. Thus, the selection indicator displayed on the display unit 110 is moved at a speed slower than a specific speed An example where the jog disk 122 is operated is as follows.

Figure 3:
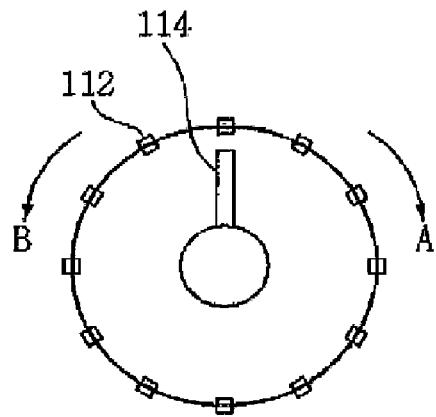
FIG. 3 illustrates an example where a jog disk in accordance with an embodiment of this document is operated.

FIG. 3 illustrates an example where the jog disk in accordance with an embodiment of this document is operated.

Referring to FIG. 3, the jog disk 122 comprises a rotary type input device, which is rotated and moved in the clockwise direction A or the counterclockwise direction B.

The jog disk 122 has locknuts 112, having a magnetic field, formed therein every 30 degrees (that is, a basic rotation angle). The jog disk 122 further comprises a sensor unit 114 having a different magnetic field from that of the locknuts 112.

For example, when the locknuts 112 of the jog disk 122 have the S-pole magnetic field, the sensor unit 114 can have the N-pole magnetic field. Thus, if the jog disk 122 is rotated and moved by 30 degrees (that is, the basic rotation angle) in the clockwise direction A or the counterclockwise direction B, the sensor unit 114 having the N-pole magnetic field is rotated and moved and then generates a rotation signal while stopping responding to the locknuts 112 having the S pole. The rotation signal is output to the controller 140.

An example of a method of setting the sensitivity of the jog disk 122 operating as described above is as follows.

Figure 4:
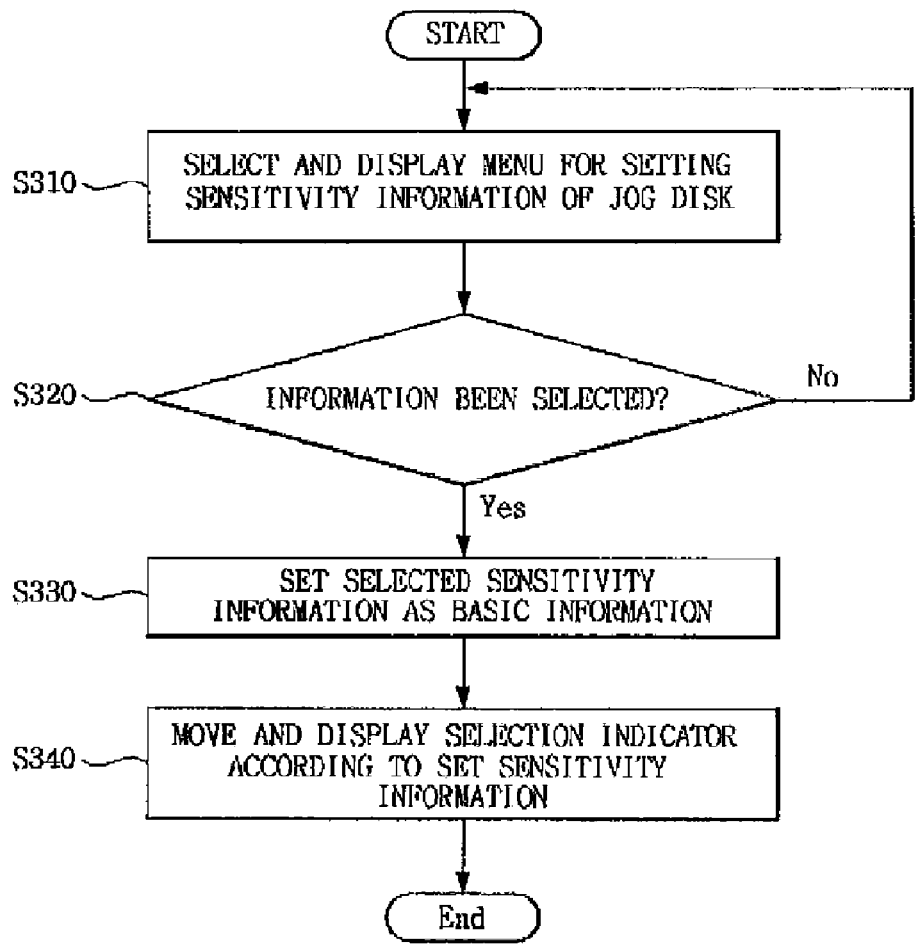
FIG. 4 is a flowchart illustrating a method of setting the sensitivity of the jog disk in the mobile terminal in accordance with an embodiment of this document.
Figure 5:
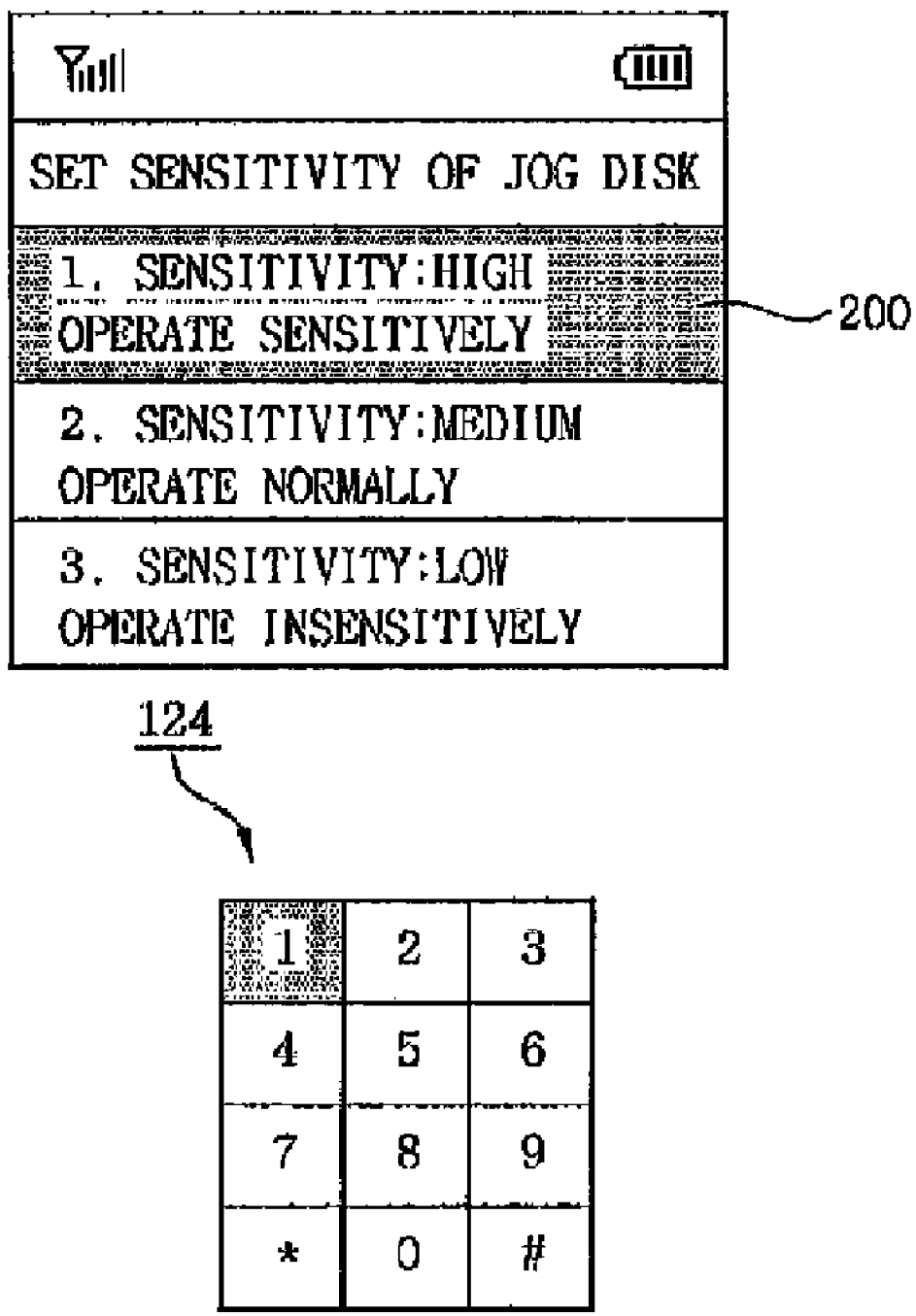
FIG. 5 illustrates a sensitivity setting menu of the jog disk in accordance with an embodiment of this document.

FIG. 4 is a flowchart illustrating a method of setting the sensitivity of the jog disk in the mobile terminal in accordance with an embodiment of this document. FIG. 5 illustrates a sensitivity setting menu of the jog disk in accordance with an embodiment of this document.

Referring to FIG. 4, a user selects a menu for setting sensitivity information of the jog disk 122. In response thereto, the controller 140 controls the menu to be displayed on the display unit 110 in step S310, as shown in FIG. 5.

The sensitivity of the jog disk 122 refers to that, when a user rotates and moves the jog disk 122, the jog disk 122 responses thereto sensitively or insensitively.

Sensitivity information of the jog disk 122 can include three types as in the menu displayed on the display unit 110. For example, the tress types can include "2. Sensitivity: Medium", which is the sensitivity becoming a reference when the jog disk 122 is rotated and moved. "1. Sensitivity: High" refers to that the jog disk 122 responds more rapidly than the sensitivity becoming a reference and operates sensitively. "3. Sensitivity: Low" refers to that the jog disk 122 responds more slowly than the sensitivity becoming a reference and operates insensitively. What the jog disk 122 responds more rapidly or slowly means whether the recognition cycle where the controller 140 recognizes the rotation signal, generated when the jog disk 122 is rotated and moved, as the basic input signal is fast or slow.

For example, in the case of "2. Sensitivity: Medium/", that is, a reference sensitivity, the recognition cycle can be set to "2". In the case of "1. Sensitivity: High", the recognition cycle can be set to "1". In the case of "2. Sensitivity: Low", the recognition cycle can be set to "3".

The recognition cycle corresponding to each piece of sensitivity information is stored in the memory unit 130.

The controller 140 determines whether specific sensitivity information has been selected from the displayed sensitivity information through the keypad 124 in step S320. The controller 140 controls the selected sensitivity information to be set as basic information for operating the jog disk 122 in step S330. The controller 140 controls the movement of the selection indicator based on the set basic information when the jog disk 122 is rotated and moved in step S340.

In this case, the sensitivity information may not be selected through the keypad 124. In other words, the sensitivity information can be selected by moving the selection bar 200, that is, the selection indicator by rotating and moving the jog disk 122.

An operation of the jog disk 122 based on each piece of sensitivity information is described below.

Figure 6A:
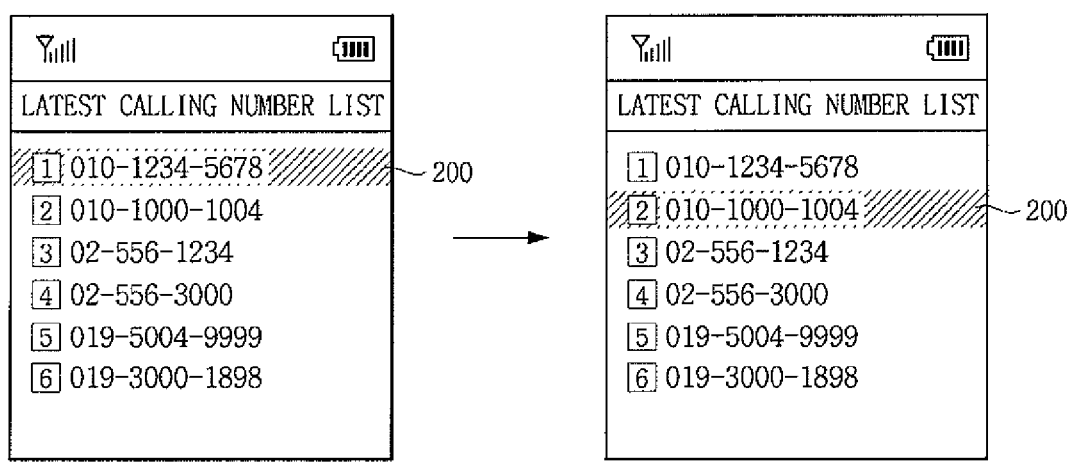
FIGS. 6A to 6C illustrate the operations of the jog disk based on each sensitivity information in accordance with an embodiment of this document.
Figure 6A:
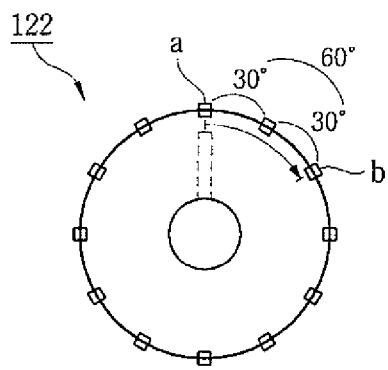
Figure 6B:
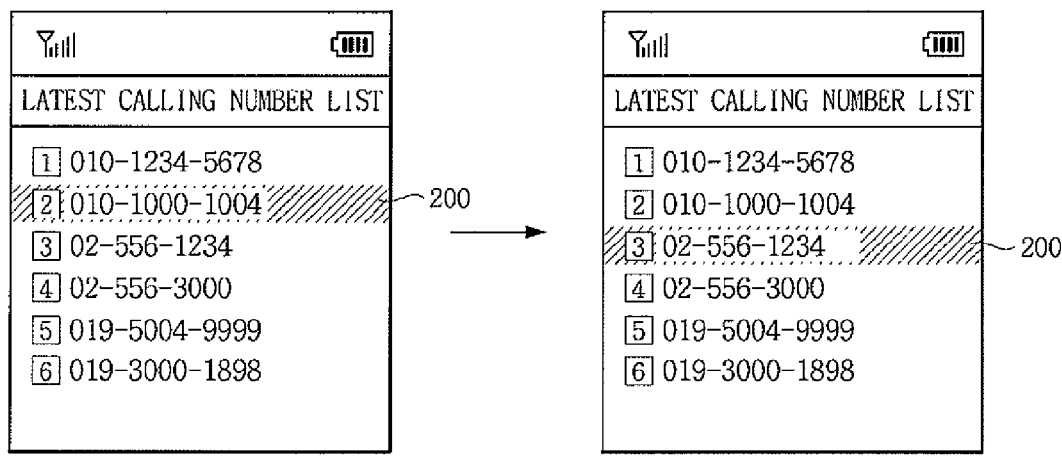
Figure 6B:
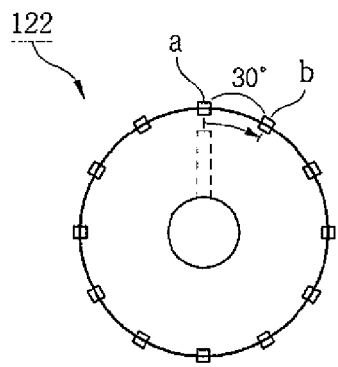
Figure 6C:
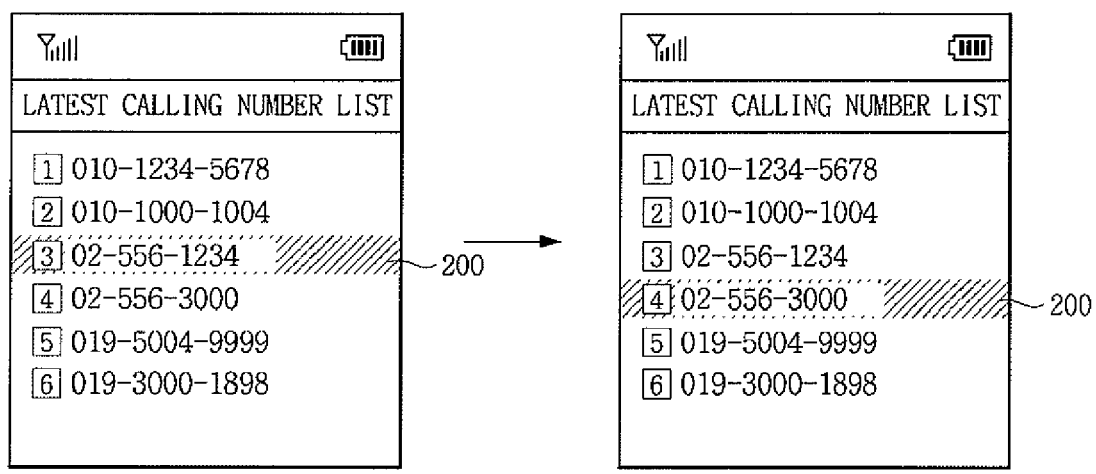
Figure 6C:
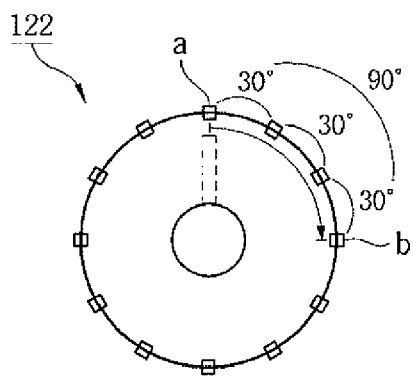

FIGS. 6A to 6C illustrate the operations of the jog disk based on each sensitivity information in accordance with an embodiment of this document.

As shown in FIG. 6A, "the latest calling number list", and the selection bar 200 for selecting one or more from the latest calling number list are displayed on the display unit 110.

In the event that sensitivity information is set to "Sensitivity: Medium", which is a reference sensitivity, the recognition cycle is set to "2". Referring back to FIG. 3, the rotation signal is generated every 30 degrees, that is, the basic rotation angles where the jog disk 122 is rotated and moved and is then output to the controller 140. When the jog disk 122 is rotated and moved at an angle of 60 degrees from a start point "a" to an end point "b" and the rotation signal is consecutively generated twice, the controller 140 recognizes them as once basic input signal. Accordingly, the controller 140 moves the selection bar 200, which is located at "1. 010-1234-5678" of the list, to "2. 010-1000-1004".

As shown in FIG. 6B, in the event that sensitivity information is set to "Sensitivity: High", which is a reference sensitivity, the recognition cycle is set to "1". When the jog disk 122 is rotated and moved at an angle of 30 degrees from a start point "a" to an end point "b" and the rotation signal is generated once, the controller 140 recognizes it as a basic input signal. Accordingly, the controller 140 moves the selection bar 200, which is located at "2. 010-1000-1004" of the list, to "3. 02-556-1234".

As shown in FIG. 6c, in the event that sensitivity information is set to "Sensitivity: Low", which is a reference sensitivity, the recognition cycle is set to "3".

When the jog disk 122 is rotated and moved at an angle of 90 degrees from a start point "a" to an end point "b" and the rotation signal is consecutively generated three times, the controller 140 recognizes them as once basic input signal.

Accordingly, the controller 140 moves the selection bar 200, which is located at "3. 02-556-1234" of the list, to "4. 02-556-1234".

In the event that sensitivity information is set to "High", the jog disk 122 operates more sensitively than the reference sensitivity. In the event that sensitivity information is set to "Low", the jog disk 122 operates more insensitively than the reference sensitivity. As described above, a user can set sensitivity information of the jog disk 122.

In the above embodiments, what specific sensitivity information is selected from sensitivity information displayed on the display unit 110 through the keypad 124 has been described. Another example where specific sensitivity information is selected by using the keypad 124 is described below.

Figure 7A:
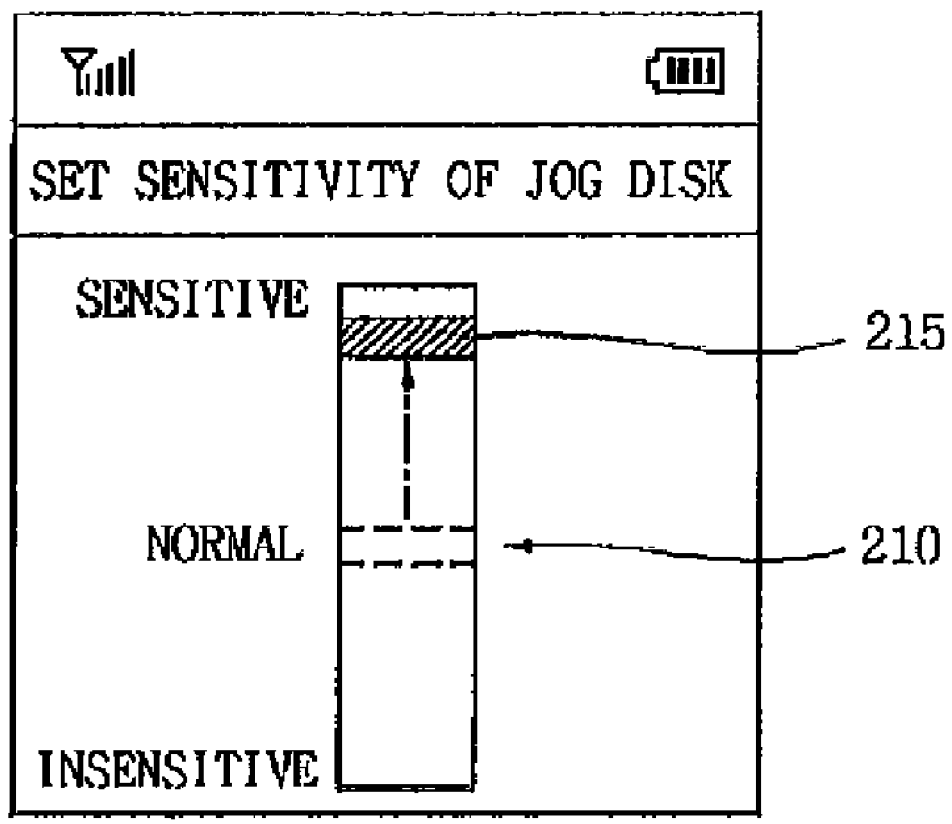
FIGS. 7A and 7B illustrate another example of setting specific sensitivity information by using a keypad.
Figure 7A:
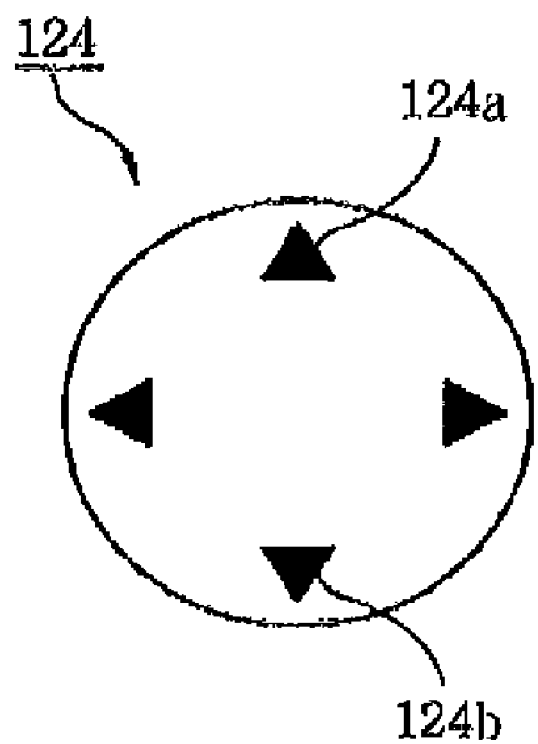
Figure 7B:
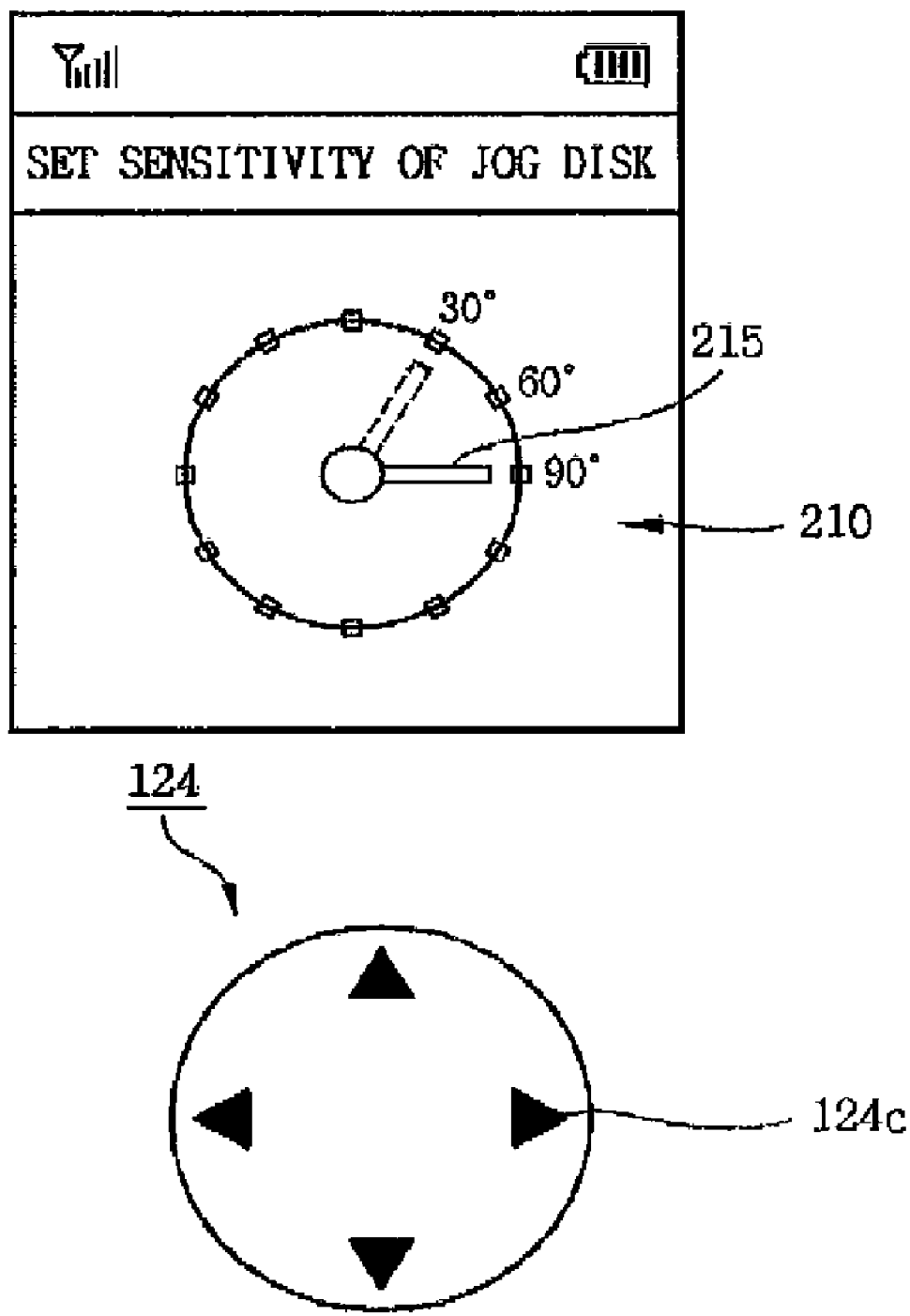

FIGS. 7A and 7B illustrate another example of setting specific sensitivity information by using the keypad 124.

As shown in FIG. 7A, if the sensitivity setting menu is selected, a user interface 210 for setting sensitivity information is displayed on the display unit 110.

In this state, sensitivity information of the jog disk 122 can be set by controlling the user interface 210 by using a direction key, which is the keypad 124 of the input unit 110.

For example, in the state where a sensitivity setting indicator 215 is at "Normal", a up direction key 124a of the direction keys, that is, the keypad 124 can be selected. The sensitivity setting indicator 215 is moved to "Sensitive", so that sensitivity information is set more sensitively than a reference as in the above "Sensitivity: High".

In the event that sensitivity information is to be set to "Insensitive", the sensitivity setting indicator 215 can be moved to "Insensitive" by using a down direction key 124b of the direction keys, that is, the keypad 124.

As shown in FIG. 7B, the user interface 210 can have the shape of the jog disk 122 in which basic rotation angles are indicated. Thus, sensitivity information can be set by moving the sensitivity setting indicator 215 by using the direction keys, that is, the keypad 124 of the input unit 110

For example, sensitivity information can be set by moving the location of the sensitivity setting indicator 215 to 90 degrees by using a right direction key 124c of the direction keys, that is, the keypad 124.

Alternatively, sensitivity information can be set by using a touch input device without using the keypad 124 and an example thereof is described below.

Figure 8:
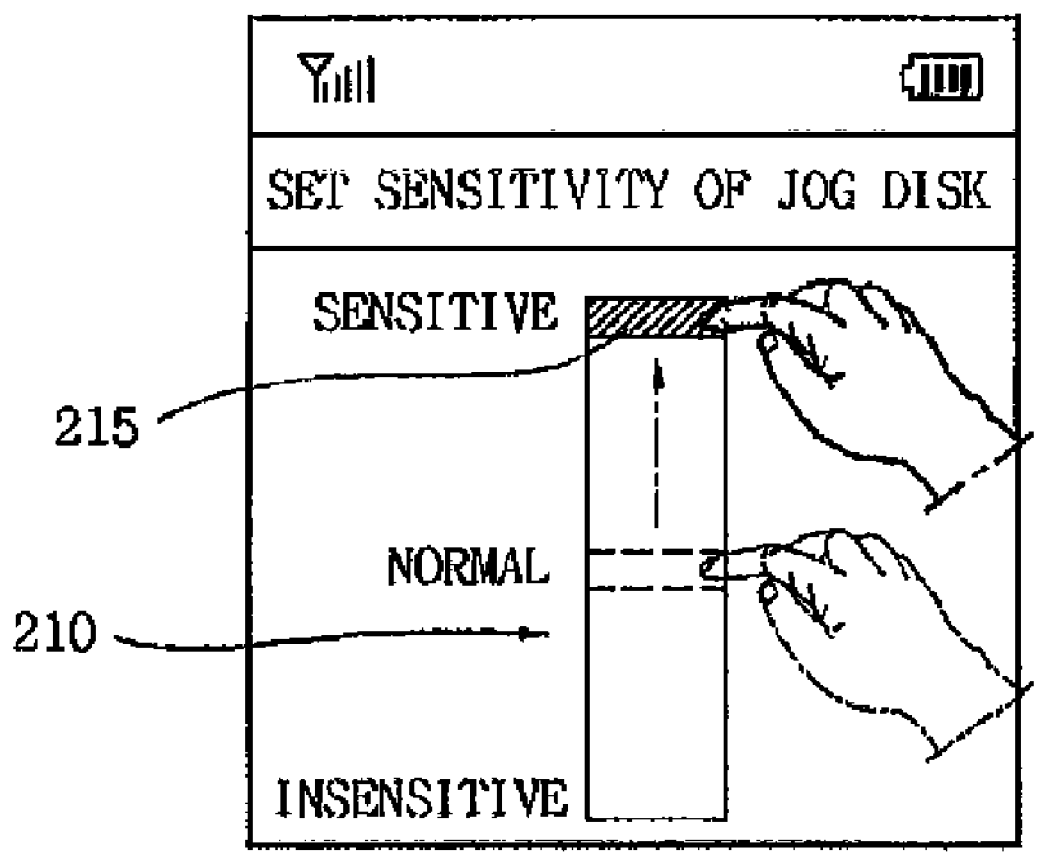
FIG. 8 illustrates an example of setting specific sensitivity information by using a touch input device.

FIG. 8 illustrates an example of setting specific sensitivity information by using a touch input device.

As shown in FIG. 8, the display unit 110 can comprise a touch screen, that is, a touch input device. If the sensitivity setting menu is selected, the user interface 210 for setting sensitivity information is displayed on the touch screen.

In the state where the sensitivity setting indicator 215 is at "Normal", the sensitivity setting indicator 215 is touched and then dragged-and-dropped to "Sensitive". Accordingly, sensitivity information is set to "Sensitive".

If sensitivity information is to be set to "Insensitive", the sensitivity setting indicator 215 can be touched and then dragged-and-dropped to "Insensitive". It is also possible to set sensitivity information by using all kinds of touch type input devices, such as a touch pad, as well as the touch screen.

Further, sensitivity information can be provided in various ways as well as the three types: High, Medium, and Low. In this case, it is also possible to provide corresponding sensitivity information by dividing a cycle where the controller 140 recognizes the rotation signal of the jog disk 122 as a basic input signal into several cycles.

<Another Embodiment—Variable Control According To Speed where Jog Disk is Rotated and Moved>

Figure 9:
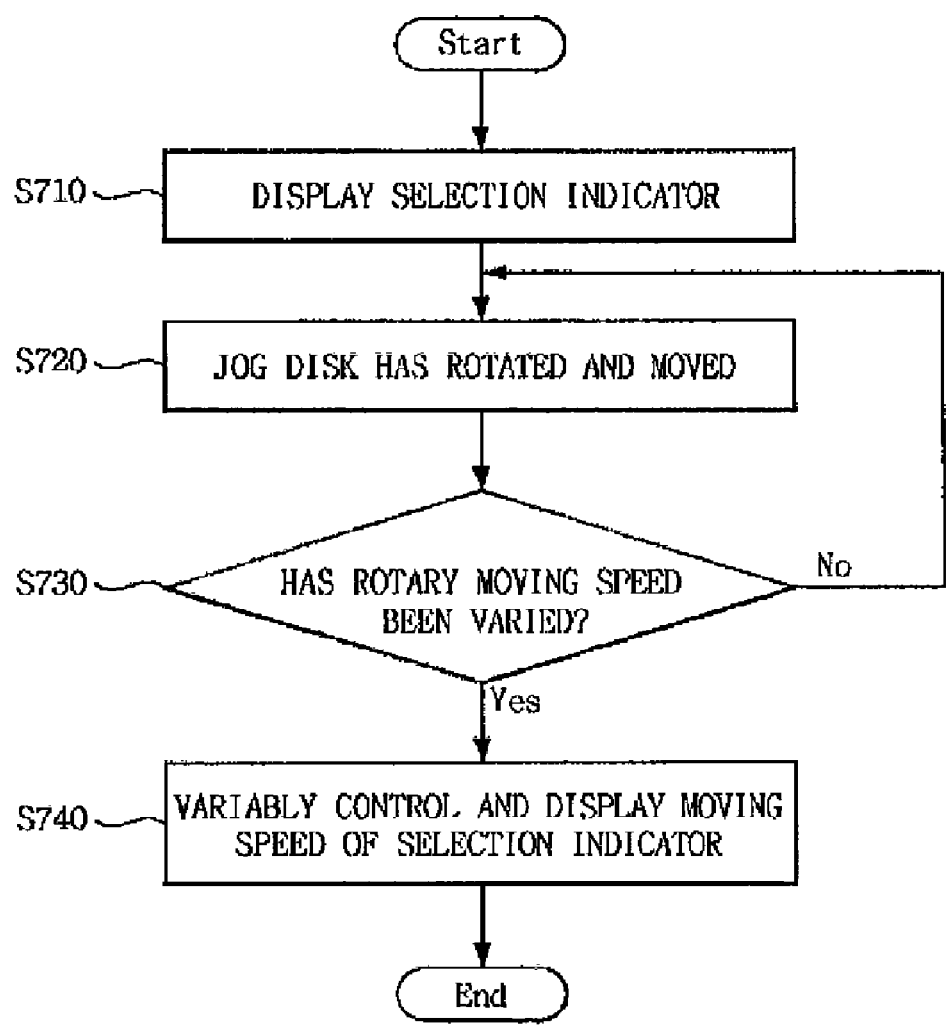
FIG. 9 is a flowchart illustrating a method of variably controlling the moving speed of a selection indicator according to the speed at which the jog disk is rotated and moved in accordance with another embodiment of this document.
Figure 10A:
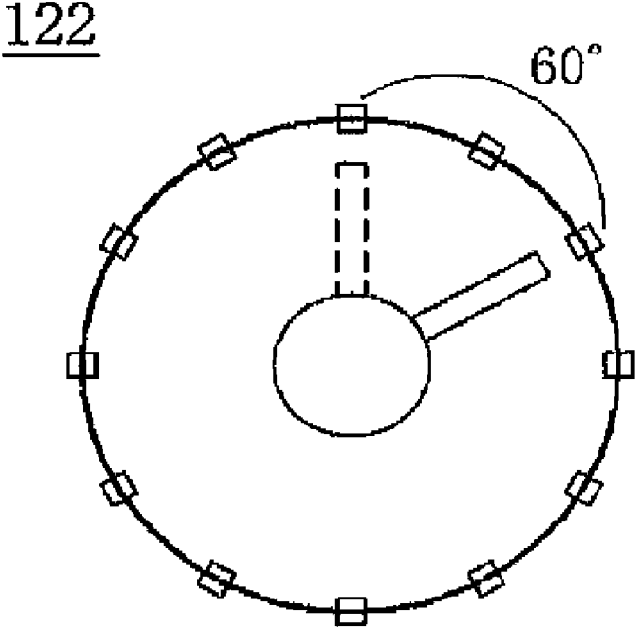
FIGS. 10A and 10B illustrate that the moving speed of the selection indicator is variably controlled according to the speed at which the jog disk is rotated and moved in accordance with another embodiment of this document.
Figure 10B:
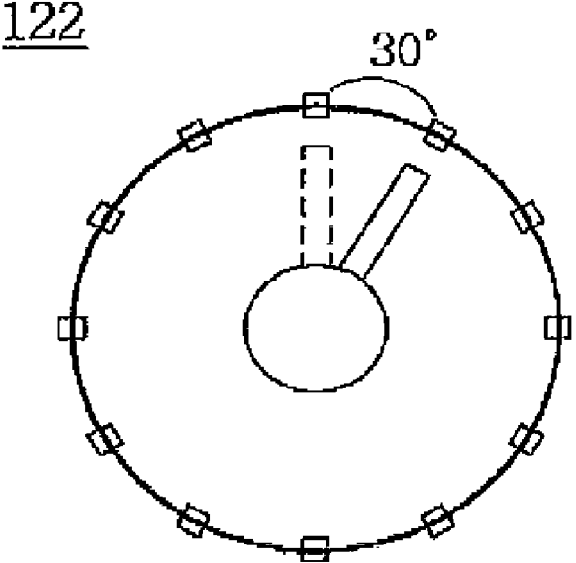

FIG. 9 is a flowchart illustrating a method of variably controlling the moving speed of a selection indicator according to the speed at which the jog disk is rotated and moved in accordance with another embodiment of this document. FIGS. 10A and 10B illustrate that the moving speed of the selection indicator is variably controlled according to the speed at which the jog disk is rotated and moved in accordance with another embodiment of this document.

Referring to FIG. 9, the selection indicator, which is moved as the jog disk 122 is rotated and moved, is displayed on the display unit 110 in step S710. In order to move the selection indicator, the jog disk 122 is rotated and moved in step S720.

The controller 140 determines whether a speed at which the jog disk 122 is rotated and moved varies in step S730. If, as a result of the determination, the speed at which the jog disk 122 is rotated and moved varies, the controller 140 variably controls the moving speed of the selection indicator and controls it to be displayed on the display unit 110 in step S740.

For example, as shown in FIG. 10A, the recognition cycle where the rotation signal of the jog disk 122 is recognized as a basic input signal is set to "2 (the recognition angle where the basic input signal is recognized is 60 degrees)".

In this state, the jog disk 122 is rotated and moved rapidly so that the basic input signal of the jog disk 122 is generated once or more less than 1 second. Thus, the controller 140 sets, as shown in FIG. 10B, the recognition cycle where the rotation signal of the jog disk 122 is recognized to "1 (the recognition angle where the basic input signal is recognized is 60 degrees)" so that the jog disk 122 operates sensitively.

Alternatively, the jog disk 122 may operate differently, an example of which is described below.

Figure 11A:
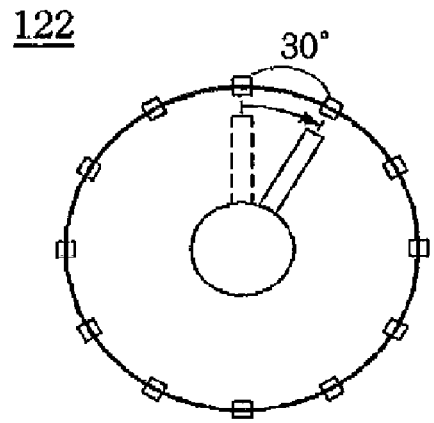
FIGS. 11A to 11C illustrate another example where a basic input signal of the jog disk is changed according to the speed at which the basic input signal of the jog disk is generated in accordance with another embodiment of this document.
Figure 11B:
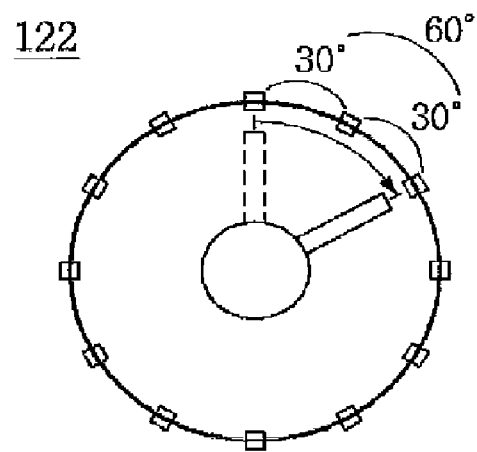
Figure 11C:
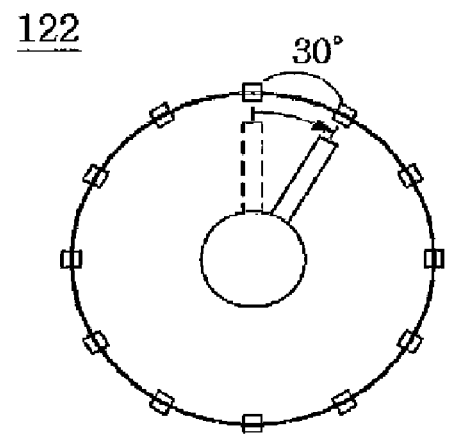

FIGS. 11A to 11C illustrate another example where a basic input signal of the jog disk is changed according to the speed at which the basic input signal of the jog disk is generated in accordance with another embodiment of this document.

As shown in FIG. 11A, a recognition cycle where the rotation signal of the jog disk 122 is recognized is set to "1 (the recognition angle where the basic input signal is recognized is 30 degrees)", which is a reference recognition cycle, so that the jog disk 122 operates during a certain time.

At this time, the jog disk 122 operates sensitively since the recognition cycle is se to "1". In other words, in order to move the selection indicator once, the jog disk 122 has to be controlled near such that it is rotated and moved at an angle of 30 degrees. This is inconvenient.

To obviate this inconvenience, the controller 140 controls the jog disk 122 to operate insensitively. For example, the controller 140 can change the recognition cycle where the rotation signal of the jog disk 122 is recognized to "2 (the recognition angle is 60 degrees)", as shown in FIG. 11B. Accordingly, the jog disk 122 operates insensitively, so that a user does not need to rotate and move the jog disk 122 minutely.

In this state, the jog disk 122 operates for a certain time and can then have its rotation speed changed.

The jog disk 122 operates insensitively since the recognition cycle is set to "2". In other words, in order to move the selection indicator once, the jog disk 122 has to be manipulated so that it is rotated and moved at an angle of 60 degrees. Thus, in order to move the selection indicator several times, the jog disk 122 has to be manipulated so that it is rotated and moved several times at an angle of 60 degrees. This is inconvenient.

To obviate this inconvenience, the controller 140 controls the jog disk 122 to operate sensitively.

For example, the controller 140 can set the recognition cycle where the rotation signal of the jog disk 122 is recognized to "1 (the recognition angle is 30 degrees)", as shown in FIG. 110. Accordingly, the jog disk 122 operates sensitively. Consequently, a user does not need to manipulate the jog disk 122 so that it is rotated and moved several times at an angle of 60 degrees.

As described above, the moving speed of the selection indicator can be changed and controlled variably by changing the recognition cycle where the controller 140 recognizes the rotation signal based on a speed at which the jog disk 122 is rotated and moved. In this case, the recognition cycle can be set over several ranges. Further, the controller 140 can set a time, which is a reference for determining that a speed at which the jog disk 122 is rotated and moved is changed.

<Still Another Embodiment—Remove Operation Delay of Jog Disk>

An example of removing operation delay of the jog disk in accordance with still another embodiment of this document is described below with reference to FIG. 12.

Figure 12:
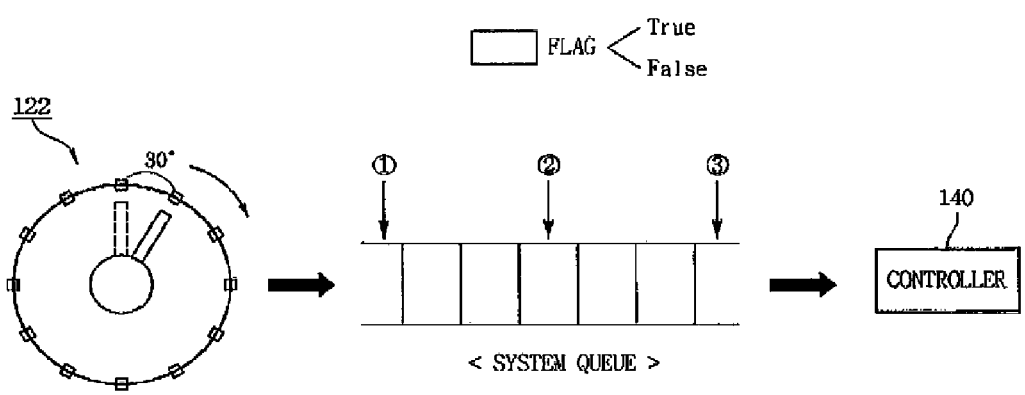
FIG. 12 illustrates an example where operation delay of the jog disk is eliminated in accordance with another embodiment of this document.

FIG. 12 illustrates an example where operation delay of the jog disk is eliminated in accordance with another embodiment of this document.

As shown in FIG. 12, if the jog disk 122 is rotated, basic rotation signals are output every 30 degrees (that is, the basic rotation angles). The basic rotation signals are sequentially input to the system queue of the memory unit 130.

In the system queue, signals input from various hardware of the mobile terminal 10 wait for being processed sequentially. The signals waiting for in the system queue are processed according to a First-In-First-Out (FIFO) discipline.

Thus, in the event that a user rapidly rotates and moves the jog disk 122, a speed at which rotation signals are input on the ① side is faster than a speed at which rotation signals are processed on the ③ side, so that the rotation signals input on the ① side are accumulated on the system queue. Accordingly, nevertheless the rotary movement of the jog disk 122 has been finished, rotation signals, which have been accumulated on the system queue and not been processed, are sequentially processed, thus generating unwanted output signals of the jog disk 122.

Thus, in the controller 140, a specific flag is set to "False" when the operation of the jog disk 122 is finished. The controller 140 controls the rotation signals of the jog disk 122, which wait for in the system queue, not to be processed, so that the occurrence of unwanted output signals of the jog disk 122 can be prevented.

A reference for determining whether the operation of the jog disk 122 has been finished is that a next rotation signal is not input even after a specific time (for example, 100 ms) since the rotation signal of the jog disk 122 is generated.

The specific time refers to a stable time when one rotation signal is transferred from the ① side to the ③ side. The reason why the time is set as described above is that if the flag is set within a time shorter than the specific time, the flag is set to "False" before once rotation signal is transferred to the controller 140, and the jog disk 122 can be determined not to operate.

In the above embodiments, it has been described that the rotary type input device is the jog disk 122. It is, however, to be noted that the rotary type input device is not limited to the jog disk 122. For example, the rotary type input device can include a jog dial, a jog shuttle or the like.

Further, it has been described that the selection bar 200 is moved by using the jog disk 122. It is, however, to be noted that the selection bar 200 can be moved by using other selection indicators such as a cursor.

As described above, this document has the following advantages.

First, there is an advantage in that a user can set the rotary sensitivity of a rotary type input device, thus improving convenience.

Second, a recognition cycle where a rotation signal is recognized as a basic input signal can be set variably according to a speed at which a user gives an input to a rotary type input device. Accordingly, there is an advantage in that user convenience can be further improved.

Third, there is an advantage in that operation delay can be prevented, which is incurred by the occurrence of unwanted output signals due to a processing delay of rotation signals despite that the rotary movement of a rotary type input device has been finished.

While the document has been described in connection with what is presently considered to be practical exemplary embodiments, it is to be understood that the document is not limited to the disclosed embodiments, but, on the contrary, is intended to cover various modifications and equivalent arrangements included within the spirit and scope of the appended claims.

What is claimed is:

1. A mobile terminal, comprising:
a display unit for displaying a selection indicator;
an input unit comprising a rotary type input device, which is rotated and moved in one or more directions, and configured to set sensitivity information indicating a sensitivity when the rotary type input device is rotated and moved, the rotary type input device including a plurality of locknuts defining basic rotation angles, each locknut having a magnetic field, and a sensor unit generating rotation signals when the sensor unit is magnetically coupled to at least one of the locknuts; and
a controller for sensing the rotary movement of the rotary type input device and controlling movement of the selection indicator, based on the sensitivity information set by the input unit,
wherein the controller is configured to display a menu including a plurality of sensitivity information,
wherein the sensitivity information includes a basic rotation recognition angle at which the controller recognizes a basic input signal,
wherein the basic rotation recognition angle is an integer times the basic rotation angle, and
wherein the controller is configured to change the basic rotation recognition angle through the menu.

2. The mobile terminal of claim 1, wherein:
the sensitivity information includes information corresponding to a recognition cycle where the rotation signals are recognized as basic input signals for moving the selection indicator.

3. The mobile terminal of claim 2, wherein:
the controller controls the recognition cycle to be faster than a specific reference, so that the selection indicator moves at a speed faster than a specific speed, when the sensitivity information is set to be more sensitive than a reference, and
the controller controls the recognition cycle to be slower than the specific reference, so that the selection indicator moves at a speed slower than the specific speed, when the sensitivity information is set to be less sensitive than the reference.

4. The mobile terminal of claim 1, wherein the rotary type input device comprises one of a jog disk, a jog dial, and a jog shuttle.

5. A mobile terminal, comprising:
an input unit comprising a rotary type input device that is rotated and moved in one or more directions, the rotary type input device including a plurality of locknuts defining basic rotation angles, each locknut having a magnetic field, and a sensor unit generating rotation signals when the sensor unit is magnetically coupled to at least one of the locknuts;
a display unit for displaying a selection indicator that is moved according to the rotary movement of the rotary type input device;
a memory unit for storing a basic rotation recognition angle based on the rotation speed of the input unit; and
a controller for variably controlling a moving speed of the selection indicator based on a speed at which the rotary type input device is rotated and moved,
wherein the moving speed of the selection indicator is adjusted by changing the basic rotation recognition angle stored in the memory unit.

6. The mobile terminal of claim 5, wherein the controller increases the moving speed of the selection indicator when the speed at which the rotary type input device is rotated and moved is faster than a reference time, and decreases the moving speed of the selection indicator when the speed at which the rotary type input device is rotated and moved is slower than the reference time.

7. The mobile terminal of claim 5, wherein the rotary type input device comprises one of a jog disk, a jog dial, and a jog shuttle.

8. A mobile terminal, comprising:
an input unit comprising a rotary type input device, which is rotated and moved in one or more directions and generates rotation signals at specific angles, the rotary type input device including a plurality of locknuts defining basic rotation angles, each locknut having a magnetic field, and a sensor unit generating rotation signals when the sensor unit is magnetically coupled to at least one of the locknuts;
a display unit for displaying a selection indicator that is moved according to the rotation signals of the rotary type input device;
a memory unit for sequentially storing the generated rotation signals; and
a controller for controlling specific rotation signals, which are accumulated and are not processed on a system queue of the memory unit, to be deleted so that the selection indicator is moved when the rotary movement of the rotary type input device is finished.

9. The mobile terminal of claim 8, wherein a reference where the controller determines whether the rotary movement of the rotary type input device has been finished includes a time when one rotation signal is stored in the memory unit and processed by the controller.

10. The mobile terminal of claim 8, wherein the rotary type input device comprises one of a jog disk, a jog dial, and a jog shuttle.

11. A method of setting a sensitivity of a rotary type input device, the rotary type input device including a plurality of locknuts defining basic rotation angles, each locknut having a magnetic field, and a sensor unit generating rotation signals when the sensor unit is magnetically coupled to at least one of the locknuts, the method comprising:
displaying a user interface for setting sensitivity information;
setting the sensitivity information when the rotary type input device that is rotated and moved in one or more directions is rotated and moved, the rotary type input device generating rotation signals at specific angles during the time of the rotary movement;
displaying a selection indicator; and
sensing the rotary movement of the rotary type input device and moving and displaying the selection indicator, based on the sensitivity information,
wherein the sensitivity information is set through the user interface, and
wherein changing the sensitivity information changes the specific angles at which the rotation signals are generated.

12. The method of claim 11, wherein:
the sensitivity information includes information corresponding to a recognition cycle where the rotation signals are recognized as basic input signals for moving the selection indicator.

13. The method of claim 12, wherein:
when the sensitivity information is set to be more sensitive than a reference, the recognition cycle is set to be faster than a specific reference, so that the selection indicator moves at a speed faster than a specific speed, and
when the sensitivity information is set to be less sensitive than the reference, the recognition cycle is set to be slower than the specific reference, so that the selection indicator moves at a speed slower than the specific speed.

14. The method of claim 11, wherein the rotary type input device comprises one of a jog disk, a jog dial, and a jog shuttle.

15. A method of setting a sensitivity of a rotary type input device, the rotary type input device including a plurality of locknuts defining basic rotation angles, each locknut having a magnetic field, and a sensor unit generating rotation signals when the sensor unit is magnetically coupled to at least one of the locknuts, the method comprising:
displaying a selection indicator that is moved when the rotary type input device, which is rotated and moved in one or more directions, is rotated and moved; and
variably controlling and displaying a moving speed of the selection indicator according to a speed at which the rotary type input device is rotated and moved,
wherein a basic rotation recognition angle based on the rotation speed of the input unit is stored in a memory unit, and
wherein the moving speed of the selection indicator is adjusted by changing the basic rotation recognition angle.

16. The method of claim 15, wherein:
when the speed at which the rotary type input device is rotated and moved is faster than a reference time, the moving speed of the selection indicator is increased, and when the speed at which the rotary type input device is rotated and moved is slower than the reference time, the moving speed of the selection indicator is decreased.

17. The method of claim 15, wherein the rotary type input device comprises one of a jog disk, a jog dial, and a jog shuttle.

18. A method of setting a sensitivity of a rotary type input device, the rotary type input device including a plurality of locknuts defining basic rotation angles, each locknut having a magnetic field, and a sensor unit generating rotation signals when the sensor unit is magnetically coupled to at least one of the locknuts, the method comprising:
displaying a selection indicator;
sequentially storing rotation signals, which are generated when the rotary type input device for moving the selection indicator is rotated and moved; and if the rotary movement of the rotary type input device is finished, controlling specific ones of the stored rotation signals, which are accumulated and are not processed on a system queue of a memory unit, to be deleted so that the selection indicator is moved.

19. The method of claim 18, wherein a reference for determining whether the rotary movement of the rotary type input device has been finished includes a time when one rotation signal is stored and then processed so that the selection indicator is moved.

* * * * *